(12) United States Patent
Soerensen

(10) Patent No.: US 11,881,689 B2
(45) Date of Patent: Jan. 23, 2024

(54) METHOD FOR INSTALLING AN OFFSHORE INSTALLATION

(71) Applicant: Siemens Gamesa Renewable Energy A/S, Brande (DK)

(72) Inventor: Johnny Soerensen, Videbaek (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 399 days.

(21) Appl. No.: 17/413,992

(22) PCT Filed: Nov. 18, 2019

(86) PCT No.: PCT/EP2019/081661
§ 371 (c)(1),
(2) Date: Jun. 15, 2021

(87) PCT Pub. No.: WO2020/126255
PCT Pub. Date: Jun. 25, 2020

(65) Prior Publication Data
US 2022/0052513 A1 Feb. 17, 2022

(30) Foreign Application Priority Data
Dec. 17, 2018 (EP) .................................... 18213018

(51) Int. Cl.
*H02G 9/06* (2006.01)
*H02G 1/10* (2006.01)
(Continued)

(52) U.S. Cl.
CPC ........... *H02G 1/10* (2013.01); *B63B 35/4413* (2013.01); *F03D 9/255* (2017.02); *F03D 13/25* (2016.05);
(Continued)

(58) Field of Classification Search
CPC ........... H02G 1/10; H02G 9/06; Y02E 10/727
See application file for complete search history.

(56) References Cited

U.S. PATENT DOCUMENTS

| 3,955,042 A | 5/1976 | Kellow et al. |
| 6,354,087 B1 | 3/2002 | Nakahara et al. |

(Continued)

FOREIGN PATENT DOCUMENTS

| CN | 106150929 A | 11/2016 |
| CN | 106677995 A | 5/2017 |

(Continued)

OTHER PUBLICATIONS

International Search Report and Written Opinion for PCT/EP2019/081661 dated Jan. 7, 2020.
(Continued)

*Primary Examiner* — Sherman Ng
(74) *Attorney, Agent, or Firm* — Schmeiser, Olsen & Watts LLP

(57) ABSTRACT

A method for installing an offshore installation is provided, the method including: a) providing a pipe for connecting the offshore installation with another offshore installation or an onshore installation; b) arranging an electrical cable inside the pipe; c) determining a level at or above the seabed, wherein the pipe includes a first portion arranged below the determined level and a second portion arranged above the determined level, and wherein the electrical cable is arranged inside the pipe so as to form a gap with an inner wall of the pipe along the first and second portion; d) determining an amount of cooling liquid such that, when the cooling liquid has a first temperature, the cooling liquid fills the gap along the first portion of the pipe, wherein the second portion of the pipe is free of the cooling liquid, and when the cooling liquid cools the electrical cable.

15 Claims, 5 Drawing Sheets

(51) Int. Cl.
  F03D 13/25 (2016.01)
  F03D 80/80 (2016.01)
  F03D 9/25 (2016.01)
  B63B 35/44 (2006.01)

(52) U.S. Cl.
  CPC ............... F03D 80/85 (2016.05); H02G 9/06 (2013.01); *B63B 2035/446* (2013.01); *B63B 2035/4466* (2013.01)

(56) References Cited

U.S. PATENT DOCUMENTS

| | | | |
|---|---|---|---|
| 6,400,039 B1 * | 6/2002 | Wobben | F03D 9/255 290/55 |
| 6,520,737 B1 * | 2/2003 | Fischer | F03D 80/60 415/908 |
| 2011/0203279 A1 | 8/2011 | Duong | |
| 2015/0091307 A1 | 4/2015 | Funabashi et al. | |
| 2016/0076519 A1 | 3/2016 | Blake et al. | |
| 2017/0077687 A1 * | 3/2017 | Soerensen | H02G 9/025 |
| 2018/0283361 A1 | 10/2018 | Wu et al. | |

FOREIGN PATENT DOCUMENTS

| | | |
|---|---|---|
| CN | 106907305 A | 6/2017 |
| CN | 108757289 A | 11/2018 |
| EP | 3 066 730 A1 | 9/2016 |
| EP | 3 086 424 A1 | 10/2016 |
| EP | 3577731 A1 | 12/2019 |
| EP | 3596370 A1 | 1/2020 |
| JP | 2016226194 A | 12/2016 |
| NL | 2005099 C2 | 1/2012 |
| NO | 863905 | 10/1986 |
| TW | 201525273 A | 7/2015 |
| WO | WO2012008833 A2 | 1/2012 |
| WO | WO2018162103 | 9/2013 |
| WO | 2015150277 A1 | 10/2015 |
| WO | WO 2018162104 A1 | 9/2018 |
| WO | WO2018197030 | 11/2018 |

OTHER PUBLICATIONS

European Search Report dated Jun. 25, 2019 for application No. 18213018.7.

* cited by examiner

METHOD FOR INSTALLING AN OFFSHORE INSTALLATION

CROSS-REFERENCE TO RELATED APPLICATIONS

This application claims priority to PCT Application No. PCT/EP2019/081661, having a filing date of Nov. 18, 2019, which is based on EP Application No. 18213018.7, having a filing date of Dec. 17, 2018, the entire contents both of which are hereby incorporated by reference.

FIELD OF TECHNOLOGY

The following relates to a method for installing an offshore installation.

BACKGROUND

An offshore installation, such as an offshore wind turbine, requires a transmission link to another offshore or an onshore installation, e.g. for transmission of generated power. To provide this transmission link, EP 3 086 424 A1 proposes to install power cables by the use of empty pipes between several offshore positions, e.g. between wind turbine foundations and/or a substation. The power cables are inserted into the empty pipes after installing the empty pipes in or above the seabed.

The major part of the power cables is located underwater or below the seabed and is, thus, cooled automatically. However, at the end portions of the power cables, i.e. where they are attached to the wind turbines or substations and emerge above sea level, the cables may not be sufficiently cooled. EP 3 066 730 A1 suggests filling water into the pipes to cool the power cables. Further, a water expansion system is suggested therein. The water expansion system includes an expansion tank to accommodate an additional volume of the water in the pipes when it is heated up and expanded, in particular, as a result of power being transmitted through the cable.

SUMMARY

An aspect relates to an improved method for installing an offshore installation.

Accordingly, a method for installing an offshore installation is proposed. The method comprises the steps of:
a) providing a pipe for connecting the offshore installation with another offshore installation or an onshore installation,
b) arranging an electrical cable inside the pipe,
c) determining a level at or above the seabed, wherein the pipe comprises a first portion arranged below the determined level and a second portion arranged above the determined level, and wherein the electrical cable is arranged inside the pipe so as to form a gap with an inner wall of the pipe along the first and second portion,
d) determining an amount of cooling liquid such that,
when the cooling liquid has a first temperature, the cooling liquid fills the gap along the first portion of the pipe, wherein the second portion of the pipe is free of the cooling liquid, and
when the cooling liquid cools the electrical cable and, therefore, has a second temperature higher than the first temperature, it is expanded from the first portion into the second portion, filling the gap along the first and second portion of the pipe, and
e) providing the determined amount of the cooling liquid inside the pipe.

When the cooling liquid has the first temperature and fills the gap only along the first portion of the pipe while the second portion of the pipe is free of the cooling liquid, there is no risk that cooling liquid in the second portion of the pipe, e.g., freezes. Thus, damage of the pipe and the electrical cable is avoided.

Furthermore, the second portion of the pipe being free of the cooling liquid at the first temperature serves as an expansion volume for the cooling liquid heated up to the second temperature. Thus, no additional expansion system, such as an extra expansion tank, is required.

The offshore installation and/or the other offshore installation comprises, in particular, a foundation founded in the seabed and an upper structure at least partially arranged above sea level and connected to the foundation.

The pipe is, in particular, a long and flexible tube. The pipe may, for example, be flexible enough to be wound up on a reel or drum. The pipe is used to guide and protect the electrical cables inserted into them. The pipe is, for example, made of plastic, thermoplastics, polyethylene and/or high-density polyethylene.

The step of providing the pipe includes, for example, trenching the seabed between the offshore installation and the other offshore installation or the onshore installation and laying the electrical cable into the trench. Alternatively, the pipe is provided by laying it onto the seabed.

The pipe is, for example, provided by lowering the pipe from a vessel at sea level, or from a seabed vehicle. The pipe may be provided by supplying reeled-up pipe from the vessel or the seabed vehicle.

Providing the pipe may further include connecting the pipe to the offshore installation, the other offshore installation and/or the onshore installation. The pipe may be connected to the offshore installation and/or the other offshore installation by connecting the pipe to a portion above sea level of the offshore installation and/or the other offshore installation. The portion of the offshore installation above sea level is, for example, a portion of the foundation or the tower of the offshore installation.

The electrical cable is, in particular, a power cable. The electrical cable is, in particular, a power cable for transmission of energy generated by the offshore installation. Alternatively, the electrical cable may be a power supply cable, a data transmission cable or the like.

The step of arranging the electrical cable inside the pipe is, for example, carried out after the pipe has been connected to the offshore installation. The electrical cable is, in particular, arranged inside the pipe by inserting it into one end of the pipe and pulling or pushing it to the other end of the pipe.

The first portion of the pipe and the second portion of the pipe are, in particular, continuous with each other. The first portion of the pipe constitutes, in particular, the major part of the pipe in terms of length, e.g., more than 80% or 90%. The second portion of the pipe includes, in particular, an end portion of the pipe including a free end of the pipe. The pipe comprises, for example, two second portions, one at each end portion of the pipe. The free end of the second portion is, in particular, connected to the offshore installation. The other free end of the other second portion is, in particular, connected to the other offshore installation or the onshore installation.

The gap is, preferably, an annular gap.

The step of determining the level at or above the seabed includes, in particular, analyzing weather and environmental conditions at the offshore installation. It includes, for example, determining an environmental temperature at the offshore installation. In particular, it includes determining an outside air temperature and/or a sea water temperature at the offshore installation. In particular, it includes determining a yearly environmental temperature distribution and/or a minimum environmental temperature at the offshore installation. Furthermore, it can include determining a thickness of an ice layer and/or a thickness and depth of cool (icy) water layers in the sea at the offshore installation. Determining the level at or above the seabed includes, in particular, determining a level of a freezing point above the seabed, the sea level and/or the nautical charts zero (lowest astronomical tide).

The step of determining the amount of the cooling liquid includes, for example, calculating an expansion volume of the cooling liquid depending on the first temperature, the second temperature and a density of the cooling liquid and/or determining a volume of the gap. The determined amount is, in particular, a weight of the cooling liquid.

The second portion of the pipe being free of the cooling liquid at the first temperature is, in particular, filled with air.

The cooling liquid is heated up from the first temperature to the second temperature due to cooling of the electrical cable and/or due to an increase of the outside temperature.

The step of providing the determined amount of the cooling liquid inside the pipe may include sealing the pipe at one or both end portions thereof. The pipe is, for example, sealed at the free end of the second portion and/or at the other free end at the other second portion of the pipe.

According to an embodiment, the level is a sea level at the offshore installation, a level of the seabed below the offshore installation or a level between the sea level and the seabed level.

When the level is the sea level at the offshore installation, the amount of the cooling liquid is determined by the method such that it fills, at the first temperature, only the first portion of the pipe being below the sea level. By the level being the sea level, the method avoids the risk of freezing of the cooling liquid in the pipe in conditions in which the temperature of the sea water is above freezing temperature.

When the level is the level of the seabed below the offshore installation, the amount of the cooling liquid is determined by the method such that it fills, at the first temperature, only the first portion of the pipe being below the seabed level. By the level being the seabed level, the method avoids the risk of freezing of the cooling liquid in the pipe in conditions in which the temperature of the sea water is below freezing temperature, e.g., in icy water conditions.

According to a further embodiment, the level is a level at or below which an outside temperature of the pipe is high enough so that the cooling liquid inside the first portion of the pipe is not freezing.

According to a further embodiment, the cooling liquid has the first temperature during a state in which no power is transmitted through the electrical cable.

Thus, cooling liquid in the pipe is prevented from freezing during a state in which no power is transmitted through the electrical cable.

The state in which no power is transmitted through the electrical cable, is, for example, a state in which the offshore installation is not producing energy.

According to a further embodiment, the cooling liquid has the second temperature during a state in which power is transmitted through the electrical cable.

The temperature of the cooling liquid rises from the first temperature to the second temperature, for example, as result of cooling the power transmitting electrical cable. Due to the rise of the temperature of the cooling liquid, the cooling liquid expands inside the pipe. The volume by which the cooling liquid expands can be accommodated by the second portion of the pipe. In particular, no expansion tank is required to accommodate expanded cooling liquid during power transmission of the electrical cable.

The state in which power is transmitted through the electrical cable is, for example, a state, in which the offshore installation is producing high and/or maximum energy.

According to a further embodiment, the determined amount of the cooling liquid is provided inside the pipe in step e) by filling the determined amount of the cooling liquid into the pipe.

The cooling liquid is, for example, filled into the pipe at the free end of the second portion.

According to a further embodiment, the method comprises the step of filling a larger amount than the determined amount of the cooling liquid into the pipe. The determined amount of the cooling liquid is provided in step e) inside the pipe by draining an excess amount of the cooling liquid from the pipe.

The larger amount than the determined amount of the cooling liquid is, for example, filled into the pipe when arranging the electrical cable inside the pipe in step b). Alternatively, the larger amount of the cooling liquid may be filled into the pipe after arranging the electrical cable inside the pipe. In particular, the larger amount may be filled into the pipe in step e) just before draining the excess amount of the cooling liquid from the pipe.

The excess amount is the difference between the larger amount and the determined amount.

The larger amount of the cooling liquid is, in particular, an amount that, at the first temperature, completely fills the gap in the first and second portions of the pipe. Thus, the larger amount may be measured by filling the pipe to the top.

By filling the larger amount than the determined amount and draining the excess amount, the determined amount of the cooling liquid can be easier provided. This is in particular the case as the larger amount may be simply measured by filling the pipe to the top and as the excess amount may be a much smaller amount than the determined amount and is, thus, easier to measure.

According to a further embodiment, the electrical cable is arranged inside the pipe in step b) by pushing the electrical cable by the cooling liquid, thereby filling the larger amount of the cooling liquid into the pipe.

The cooling liquid, is for example, filled into the pipe with high pressure.

Arranging the electrical cable inside the pipe by pushing the electrical cable by the cooling liquid through the pipe allows to use the cooling liquid as driving force. In this case, the cooling liquid is preferentially water and/or sea water. Further, pushing the electrical cable by the cooling liquid through the pipe allows to arrange the electrical cable inside the pipe and fill the larger amount of cooling liquid into the pipe in only one step.

According to a further embodiment, the excess amount of the cooling liquid is drained from the pipe by a pump or by pressurized air.

The excess amount of the cooling liquid is, for example, pumped out of the free end of the pipe by the pump arranged in connection to the free end of the pipe. Alternatively, pressurized air is brought into one of the free end and the other free end of the pipe and the excess amount of the cooling liquid is drained from the other one of the free end and the other free end of the pipe.

Draining the excess amount of the cooling liquid by a pump or by pressurized air allows to improve draining of the excess amount.

According to a further embodiment, the pipe is ventilated during the draining of the excess amount of the cooling liquid from the pipe.

In embodiments, the pipe can also be ventilated during an expansion of the cooling liquid from the first portion into the second portion due to heating of the cooling liquid.

By ventilating the pipe during the draining of the excess amount and/or during expansion of the cooling liquid the air content of the pipe, i.e. of the second portion, can be balanced depending on the cooling liquid content of the pipe, i.e. of the second portion. Thus, the draining and/or expansion of the cooling liquid can be improved.

According to a further embodiment, the pipe is ventilated by a ventilation element arranged at a free end of the second portion of the pipe, the ventilation element including a floater.

Having the ventilation element allows air to escape from the pipe and, at the same time, to provide a sealing with respect to the cooling liquid. In particular, air can escape from the pipe through the ventilation element until the cooling liquid completely fills the gap in the second portion of the pipe. When the cooling liquid completely fills the gap in the second portion of the pipe, it seals the ventilation element.

The ventilation element may also include a membrane instead of a floater. The membrane is designed so as to allow air to escape while blocking the cooling liquid.

According to a further embodiment, the determined amount of the cooling liquid or the larger amount of the cooling liquid is filled into the pipe through an access port of the pipe.

The access port is, in particular, connected to the free end of the second portion of the pipe. The access port includes, for example, connecting means. The connecting means are, for example, configured for connection with a hose.

For example, the determined amount of the cooling liquid is filled in step e) into the pipe through the access port by connecting the access port of the pipe via the hose with a cooling liquid reservoir. The cooling liquid reservoir is, for example, a cooling liquid tank or the seawater surrounding the offshore installation.

For example, the larger amount of the cooling liquid is filled in step b) or in step e) into the pipe through the access port by connecting the access port of the pipe via the hose with the cooling liquid reservoir.

According to a further embodiment, the excess amount of the cooling liquid is drained from the pipe through the access port of the pipe.

For example, the excess amount of the cooling liquid is drained from the pipe through the access port by connecting the access port of the pipe via a hose with a container for accommodating the excess cooling liquid or with the surrounding seawater.

The pipe may also comprise an over-pressure safety system. A method for operating the offshore installation may then comprise a step of determining the pressure of the cooling liquid inside the pipe. The method for operating the offshore installation may further comprise the step of draining the cooling liquid partially from the pipe, e.g., through the access port, when the determined pressure exceeds a reference pressure. The reference pressure is, in particular, a pressure of the cooling liquid when it has the determined amount and the second temperature.

According to a further embodiment, one or both of the offshore installation and the other offshore installation is/are an energy generating installation, a wind turbine, a substation of a wind farm, a tidal power facility, an oil rig and/or a gas rig.

Offshore does not only include marine environments but also lakes and other open waters.

In the case that the offshore installation is an energy generating installation, the electrical cable is, for example, transmitting the energy generated by the offshore installation, in particular all of the generated energy, to the other offshore installation or the onshore installation.

An offshore wind turbine is an example of an energy generating installation. A wind turbine is an apparatus to convert the wind's kinetic energy into electrical energy. The wind turbine comprises, for example, a rotor having one or more blades, a nacelle including a generator, and a tower holding, at its top end, the nacelle. The tower of the wind turbine may be connected via a transition piece to a foundation of the wind turbine such as a monopile, tripile or tripod in the seabed.

The offshore wind turbine can be part of a wind farm. The wind farm is, in particular, an array of inter-connected wind turbines. The offshore wind turbine can be, for example, connected to a central wind turbine and/or a substation of the wind farm.

A substation of a wind farm, also called collector substation, is, in particular, a station configured to collect the energy generated by all or several of the wind turbines of the wind farm. The substation is configured to receive the energy generated by the wind turbines through electrical cables such as the described electrical cable.

The onshore installation is, for example, a station to receive the energy generated by the offshore installation. The onshore installation is, for example, an onshore transformer station.

According to a further embodiment, the cooling liquid is water, seawater, a brine solution and/or a glycol aqueous solution.

Using water and/or seawater as the cooling liquid provides a cheap and environmentally friendly cooling liquid.

A brine solution is, in particular, a saturated salt solution with, for example, about 26% salt content. When using a brine solution, in particular a brine solution with the salt saturation, as the cooling liquid a high static buoyancy is applied to the electrical cable. Thus, the electrical cable is not laying on the floor of the pipe but is floating inside the pipe. Hence, the electrical cable is surrounded by the cooling liquid which allows a better cooling and less wear of the cable.

Using a glycol aqueous solution, e.g., an ethylene glycol aqueous solution, as the cooling liquid provides better anti-freeze properties.

Further possible implementations or alternative solutions of embodiments of the invention also encompass combinations that are not explicitly mentioned herein of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
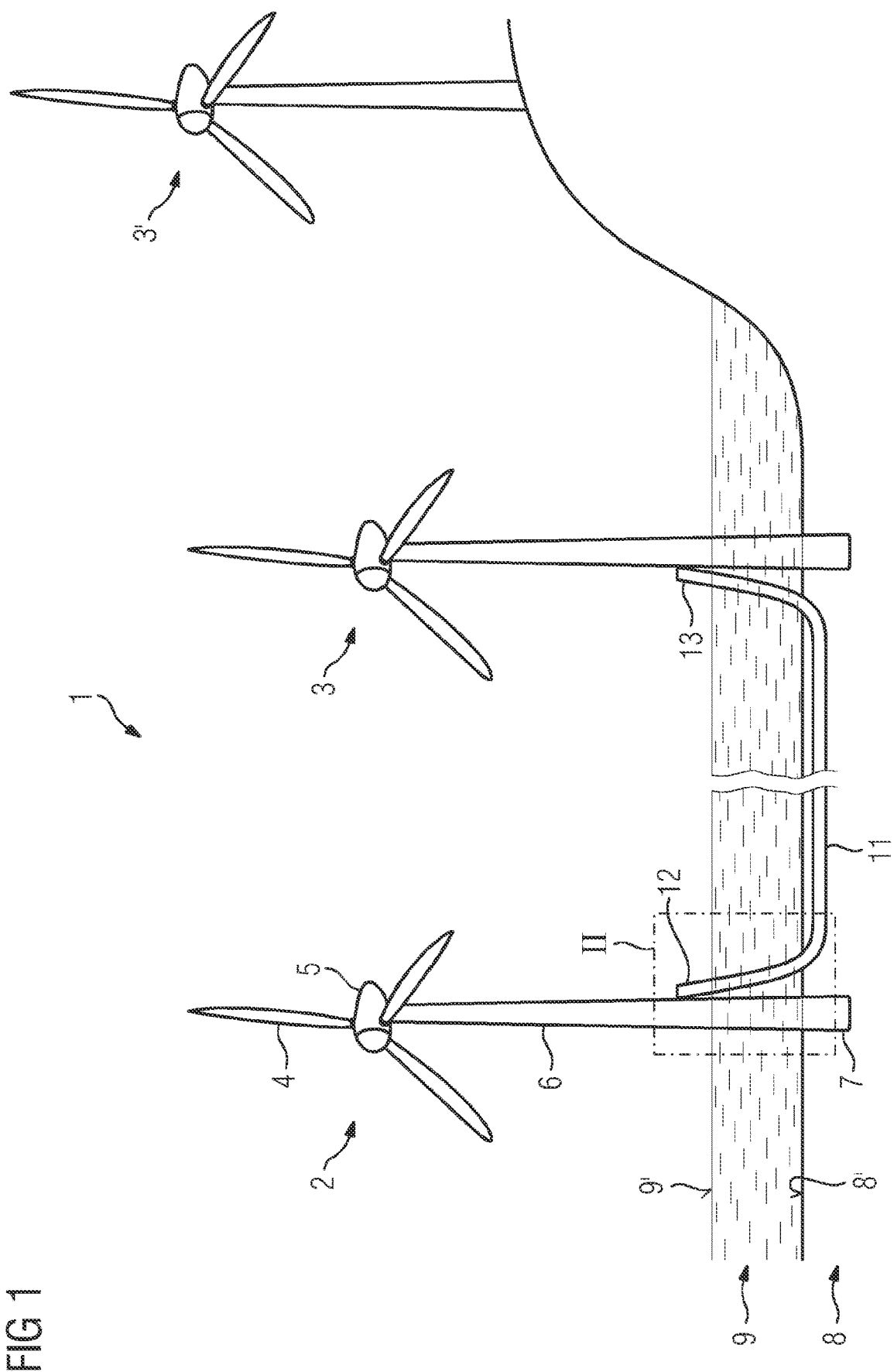
FIG. 1 shows an offshore wind farm according to an embodiment.

FIG. 1 shows an offshore wind farm 1 according to an embodiment. The offshore wind farm 1 comprises several offshore wind turbines. As an example, an offshore wind turbine 2 and another offshore wind turbine 3 of the wind farm 1 are shown in FIG. 1. In addition, an onshore wind turbine 3' is shown in FIG. 1.

Each of the wind turbines 2 and 3 comprises a rotor 4 connected to a generator (not shown) arranged inside a nacelle 5. The nacelle 5 is arranged at the upper end of a tower 6 of the wind turbine 2, 3. The tower 6 is erected on a foundation 7 such as a monopile or tripile. The foundation 7 is connected to and/or driven into the seabed 8 and extends above the sea water 9. The tower 6 can be erected directly on the foundation 7, or the tower 6 can be connected to a transition piece (not shown) and the transition piece is erected on the foundation 7.

During operation of the wind turbine 2, 3, the wind's kinetic energy is converted into electrical energy by the generator in the nacelle 5. The power generated in the generator is transmitted via an interior power cable to a switch gear (not shown) in a lower part of the tower 6 or in the transition piece. The generated power is transmitted from the switch gear via a further interior power cable to a hang-off zone 10 (FIG. 2) of the lower part of the tower 6 or the transition piece. For an electrical connection from the hang-off zone 10 onward, electrical transmission means are required to connect the interior power cable of the wind turbine 2 to another offshore installation 3 or an onshore installation 3'.

In the following an improved method for installing an offshore installation such as the wind turbine 2, is described with respect to FIGS. 2 to 11. In particular, a method for installing an electrical connection between the wind turbine 2 and the other offshore wind turbine 3 is described. Although not described in the following, the method can also be applied for installing an electrical connection between the wind turbine 2 and the onshore wind turbine 3'.

In step S1 of the method, a pipe 11 is provided for connecting the wind turbine 2 with the wind turbine 3.

The pipe 11 is, in particular, long enough to connect the wind turbine 2 with the wind turbine 3. The pipe 11 has, for example, a length of several kilometers and/or has any other length required to connect the wind turbines 2 and 3 with each other. The pipe 11 is a flexible tube made, for example, of plastic. The pipe 11 is, for example, steel armored.

For providing the pipe 11, the seabed 8 is trenched between the wind turbine 2 and the other wind turbine 3. The pipe 11 is, for example, provided by unwinding the pipe 11 from a drum (not shown) arranged on a vessel (not shown), lowering the pipe 11 from the vessel and laying it into the trench. Instead of the vessel, the pipe 11 could also be supplied by a seabed vehicle (not shown).

The pipe 11 is then connected to the wind turbine 2 and the other wind turbine 3. In the following, the connection of the pipe 11 to the wind turbine 2 is described in detail. The connection of the pipe 11 to the other wind turbine 3 may be performed in a similar manner. The pipe 11 is, in particular, connected to a portion of the wind turbine 2 which is above the level 9' of the sea water 9.

Figure 2:
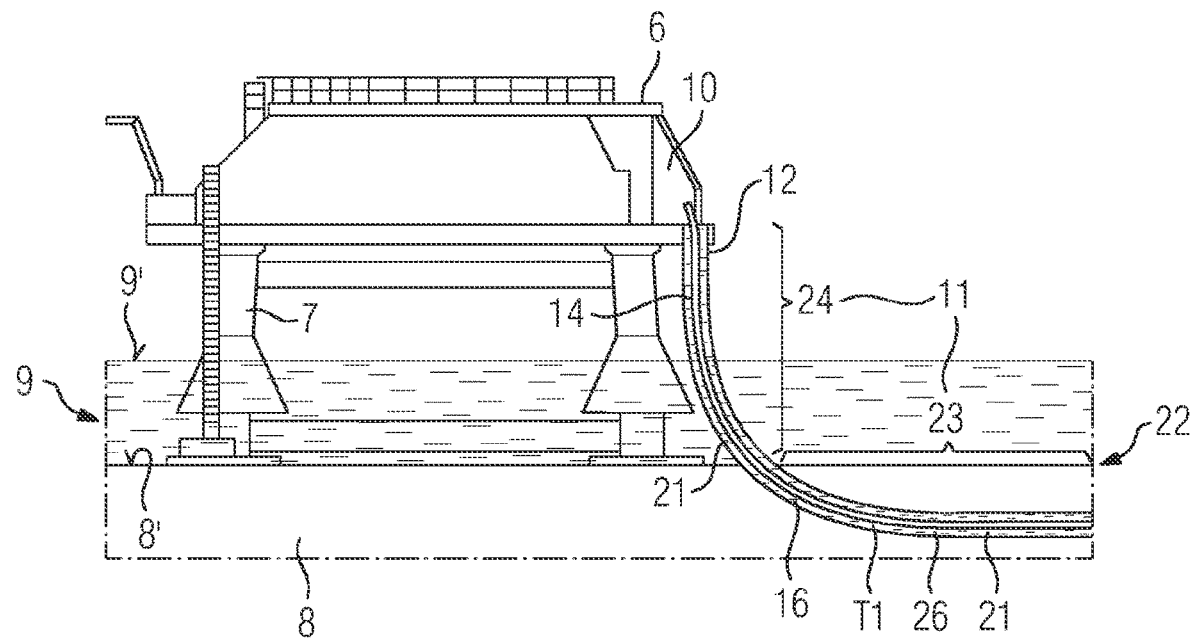
FIG. 2 shows a detailed view of a portion II of a wind turbine of the offshore wind farm of FIG. 1, the wind turbine being connected by a pipe with another wind turbine of the wind farm of FIG. 1, the pipe containing inside an electrical cable and cooling liquid at a first temperature.

FIG. 2 shows a detailed view II of the wind turbine 2 of FIG. 1. In FIG. 2 a lower part of the tower 6 including the hang-off zone 10 and the foundation 7 of the wind turbine 2 is shown. The free end 12 of the pipe 11 is, in particular fixedly, connected to the hang-off zone 10 of the wind turbine 2. Furthermore, the other free end 13 (FIG. 1) of the pipe 11 is, in particular fixedly, connected to a hang-off zone (not shown) of the other wind turbine 3.

In step S2 of the method, an electrical cable 14 (FIG. 2) is arranged inside the pipe 11. The electrical cable 14 is, in particular, arranged inside the pipe 11 by inserting it into one end (e.g., the free end 12) of the pipe 11 and pulling or pushing it to the other end (e.g., the other free end 13, FIG. 1) of the pipe 11. The electrical cable 14 is, for example, unwound from a cable drum, such as the cable drum 15 shown in FIG. 3.

Figure 3:
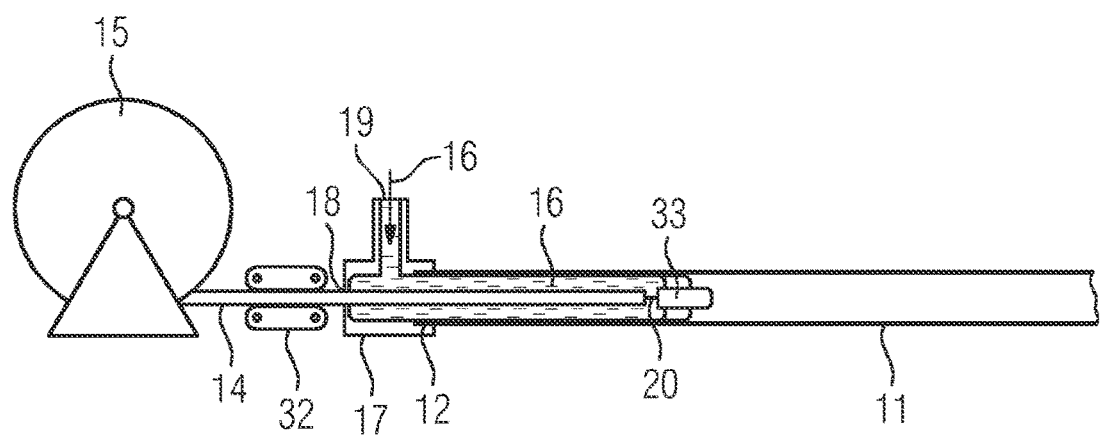
FIG. 3 shows an embodiment of arranging the electrical cable inside the pipe of FIG. 2.

FIG. 3 shows an example of arranging the electrical cable 14 inside the pipe 11 by pushing the electrical cable 14 by a cooling liquid 16, such as water and/or sea water, through the pipe 11. As shown in FIG. 3, an adapter 17 is connected to the free end 12 of the pipe 11. The adapter 17 provides on one side thereof a liquid-tight connection with the pipe 11 and comprises on the other side thereof both an opening 18 for the electrical cable 14 and a separate liquid inlet port 19. A free end 20 of the electrical cable 14 is connected to a plug 33 and inserted into the opening 18 of the pipe 11. The cooling liquid 16 is filled with high pressure into the liquid inlet port 19 and pushes, via the plug 33, the electrical cable 14 through the pipe 11 until the electrical cable 14 emerges at the other free end 13 (FIG. 1) of the pipe 11. While being pushed through the pipe 11, the electrical cable 14 is continuously unwound from the cable drum 15 and guided by guiding means 32 towards the opening 18.

In the example of FIG. 3, the pipe 11 is filled during arranging of the electrical cable 14 with the cooling liquid 16.

As shown in FIG. 2, the electrical cable 14 arranged inside the pipe 11 forms a gap 21 with an inner wall of the pipe 11. FIG. 2 shows a state in which the gap 21 of the pipe 11 is completely filled, i.e. along the entire length of the pipe 11, with the cooling liquid 16.

In step S3 of the method, a level 22 at or above the seabed 8 is determined such that the cooling liquid 16 in the pipe 11 is not freezing below this level 22. In other words, the level 22 is a level at or below which a temperature outside of the pipe 11 is high enough so that the cooling liquid 16 inside the pipe 11 and below this level 22 is not freezing.

The level 22 is determined based on weather and environmental conditions at the wind turbine 2. In the example of FIG. 2, it is determined that a minimum temperature of the sea water 9 is below zero degree Celsius. The sea water 9 contains, for example, sea ice. Thus, the cooling liquid 16 in a portion of the pipe 11 surrounded by the sea water 9 is at the risk of freezing in this example. Therefore, the level 22 has been determined here to be the level 8' of the seabed 8.

The pipe 11 comprises a first portion 23 arranged below the determined level 22 and a second portion 24 arranged above the determined level 22.

Figure 4:
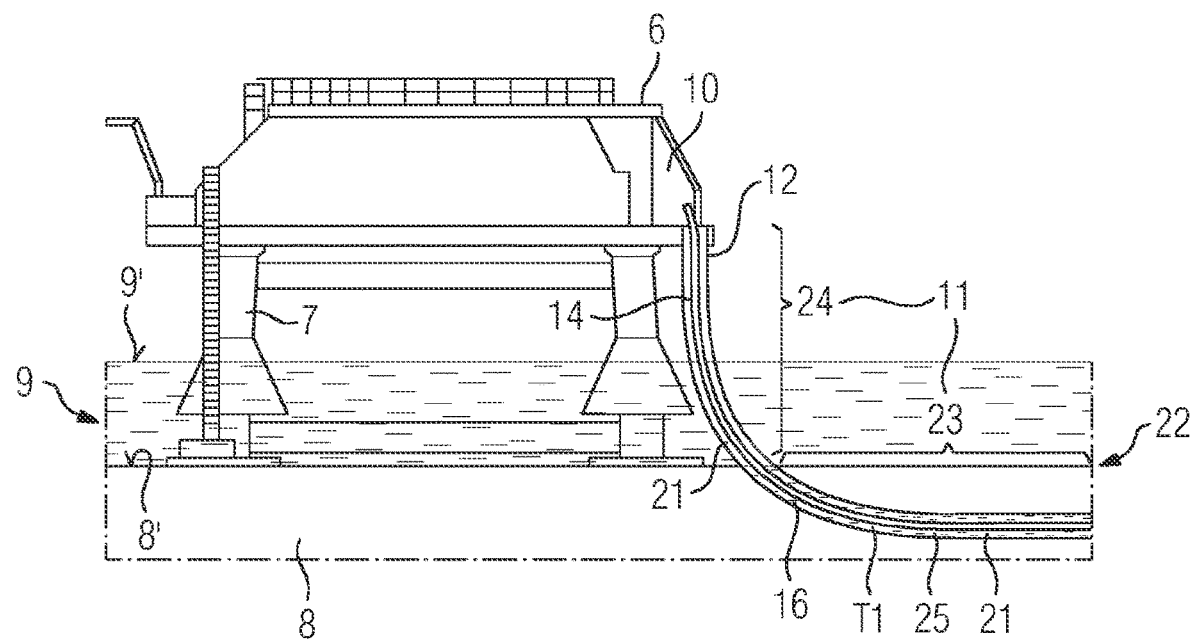
FIG. 4 shows a view similar to FIG. 2 but with an excess amount of the cooling liquid drained from the pipe.

In step S4 of the method, an amount 25 (FIG. 4) of the cooling liquid 16 is determined such that, when the cooling liquid 16 has a first temperature T1, the cooling liquid 16 having the amount 25 fills the gap 21 only along the first portion 23 of the pipe 11 but not along the second portion 24 of the pipe 11. The second portion 24 of the pipe 11 in FIG. 4 is free of the cooling liquid 16 and is filled with air.

The first temperature T1 is, for example, a temperature of the cooling liquid 16 in a state in which the wind turbine 2 is not generating power and is, therefore, not transmitting power through the electrical cable 14. The state in which the wind turbine 2 is not transmitting power through the electrical cable 14 is, for example, a state in which no wind is blowing or a state in which the rotor 4 has been blocked for safety reasons because winds are too strong.

During operation of the wind turbine 2, power is transmitted through the electrical cable 14 and is, thus, heating up the electrical cable 14. The cooling liquid 16 in the gap 21 of the pipe 11 cools the electrical cable 14. During the cooling process, the cooling liquid 16 heats up to a second temperature T2 and expands.

Figure 5:
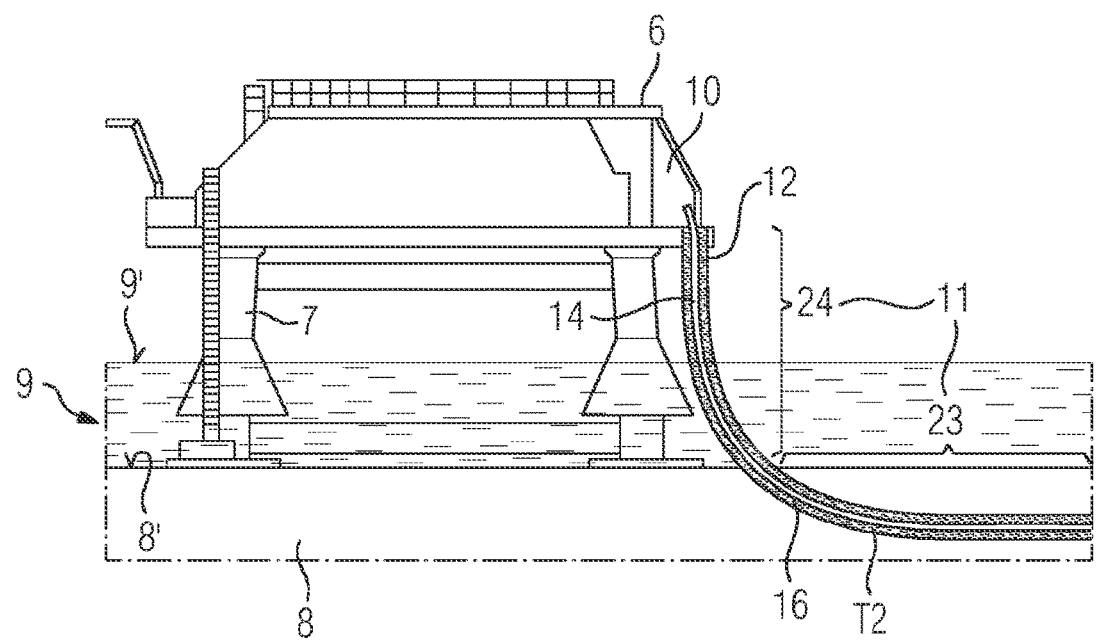
FIG. 5 shows a view similar to FIG. 4 but with the cooling liquid heated to a second temperature and expanded inside the pipe.

The amount 25 of the cooling liquid 16 is further determined in step S4 such that, when the cooling liquid 16 cools the electrical cable 14 and, therefore, has the second temperature T2, it is expanded from the first portion 23 into the second portion 24. Due to this expansion, the cooling liquid 16 fills the gap 21 along the first and second portions 23, 24 of the pipe 11, as shown in FIG. 5. As the cooling liquid 16 is heated here by the power transmitting electrical cable 14, there is no risk of freezing of the cooling liquid 16 in the second portion 24.

In step S5 of the method, the determined amount 25 of the cooling liquid 16 is provided inside the pipe 11. In a first aspect of the embodiment (FIG. 10), the method comprises the step S2' of filling a larger amount 26 than the determined amount 25 into the pipe 11, and step S5 comprises the step S5' of draining the excess amount from the pipe 11.

In the example shown in FIGS. 2 to 5, the pipe 11 has been filled (S2') already with a larger amount 26 (FIG. 2) than the determined amount 25 (FIG. 4) of cooling liquid 16 during step S2. Therefore, in this example, the determined amount 25 of the cooling liquid 16 is provided in step S5 by draining (S5') the excess amount of the cooling liquid 16, i.e. the amount by which the larger amount 26 is in excess of the determined amount 25.

Figure 6:
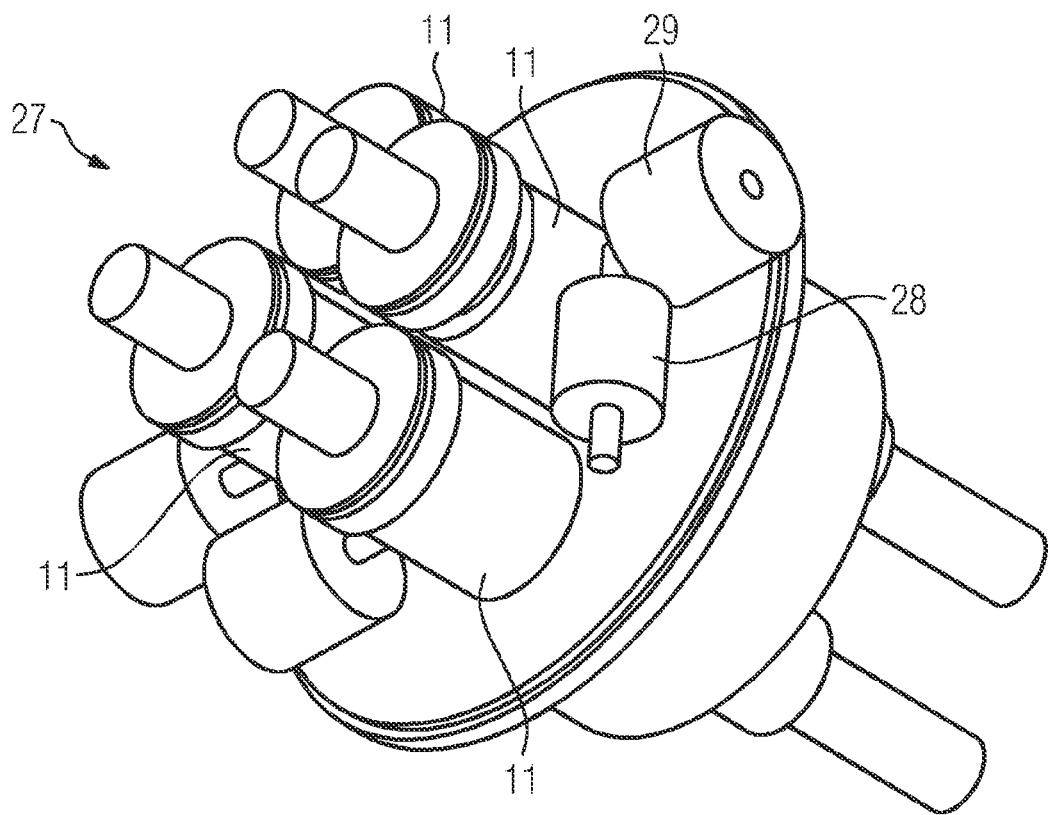
FIG. 6 shows a perspective view of a vent system configured to be arranged at the pipe.
Figure 7:
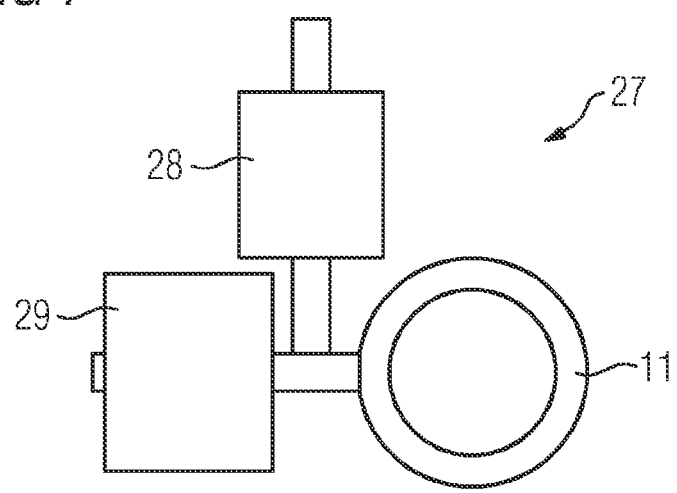
FIG. 7 shows a partial side view of the vent system of FIG. 6.
Figure 8:
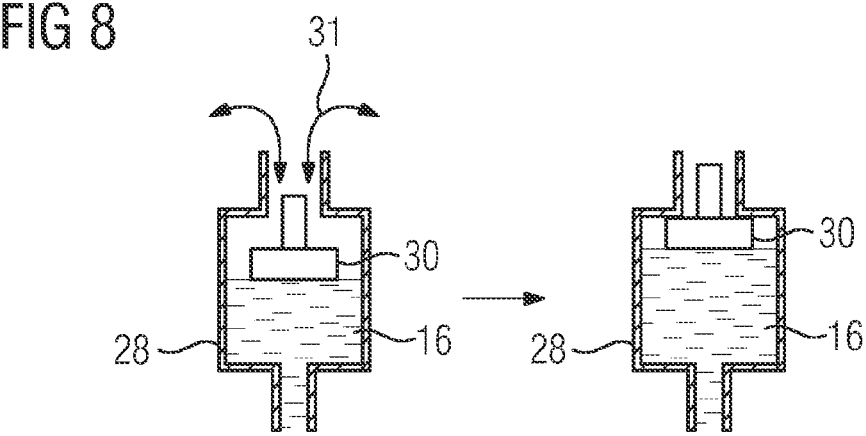
FIG. 8 shows a detailed view of a ventilation element of the vent system of FIG. 6 in two different states.
Figure 9:
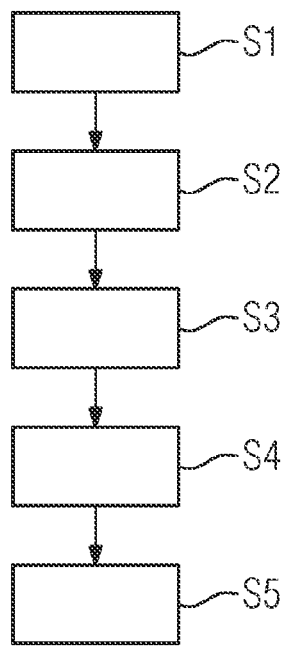
FIG. 9 shows a flowchart illustrating a method for installing the wind turbine of FIG. 1 according an embodiment.
Figure 10:
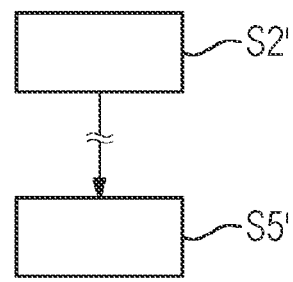
FIG. 10 shows a first aspect of step S5 of the method of FIG. 9.
Figure 11:
FIG. 11 shows a second aspect of step S5 of the method of FIG. 9.

The pipe 11 comprises at its free end 12, for example, a vent system 27, as shown in FIGS. 6 to 8. FIG. 6 shows a perspective view of the vent system 27. The vent system 27 of FIG. 6 is configured to serve, as an example, four pipes 11. FIG. 7 shows the vent system 27 in a partial side view along with one pipe 11, and FIG. 8 shows a ventilation element 28 of the vent system 27 in two different states.

The vent system 27 comprises for each pipe 11 an access port 29 for draining and/or filling of the cooling liquid 16. Further, the vent system 27 comprises the ventilation element 28 fluidly connected to each access port 29 for ventilating the pipe 11 during draining of the cooling liquid 16 and/or during expansion of the cooling liquid 16.

The excess amount of the cooling liquid 16 is drained from the pipe 11 by connecting a hose (not shown) via a pump and a liquid flow meter (not shown) with the access port 29 of the vent system 27. The cooling liquid 16 is drained by the pump from the pipe 11 and through the hose, for example, into a tank (not shown) or into the sea. The cooling liquid 16 is drained until the drained amount, as measured by the liquid flow meter, is the excess amount.

As shown in FIG. 8, the ventilation element 28 comprises a floater 30. As shown in the bottom view of FIG. 8, when the pipe 11 is completely filled with the cooling liquid 16, the floater 30 seals the ventilation element 28 to prevent cooling liquid 16 from leaking through the ventilation element 28. When the cooling liquid 16 is drained from the pipe 11, the floater 30 sinks and does not seal the ventilation element 28 any more so that air 31 can be drawn in, as shown in the top view of FIG. 8.

For example, the level 22 may also be the level 9' of the sea water 9 or a level between the sea water level 9' and the seabed level 8'.

For example, the arranging of the electrical cable 14 may not include filling of the cooling liquid 16 into the pipe 11. Then, in a second aspect of the embodiment (FIG. 11), step S5 of providing the determined amount 25 of the cooling liquid 16 into the pipe 11 may comprise the step S5" of filling the determined amount 25 of the cooling liquid 16 into the pipe 11. Thus, in the second aspect, the correct amount of the cooling liquid 16 is directly filled into the pipe 11 without the need to drain an excess amount.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for installing an offshore installation, the method comprising:
   a) providing a pipe for connecting the offshore installation with another offshore installation or an onshore installation;
   b) arranging an electrical cable inside the pipe;
   c) determining a level at or above a seabed, wherein the pipe comprises a first portion arranged below the level and a second portion arranged above the level, and wherein the electrical cable is arranged inside the pipe to form a gap with an inner wall of the pipe along the first portion and the second portion;
   d) determining an amount of cooling liquid such that;
      when the cooling liquid has a first temperature, the cooling liquid fills the gap along the first portion of the pipe, wherein the second portion of the pipe is free of the cooling liquid, and
      when the cooling liquid cools the electrical cable and has a second temperature higher than the first temperature, it is expanded from the first portion into the second portion, filling the gap along the first portion and the second portion of the pipe, and e) providing the amount of the cooling liquid inside the pipe.

2. The method according to claim 1, wherein the level is a sea level at the offshore installation, a level of the seabed below the offshore installation or a level between the sea level and the seabed level.

3. The method according to claim 1, wherein the level is a level at or below which an outside temperature of the pipe is high enough so that the cooling liquid inside the first portion of the pipe is not freezing.

4. The method according to claim 1, wherein the cooling liquid has the first temperature during a state in which no power is transmitted through the electrical cable.

5. The method according to claim 1, wherein the cooling liquid has the second temperature during a state in which power is transmitted through the electrical cable.

6. The method according to claim 1, wherein the determined amount of the cooling liquid is provided inside the pipe in step e) by filling the amount of the cooling liquid into the pipe.

7. The method according to claim 1, further comprising filling a larger amount than the amount of the cooling liquid into the pipe, and wherein the amount of the cooling liquid is provided in step e) inside the pipe by draining an excess amount of the cooling liquid from the pipe.

8. The method according to claim 7, wherein the electrical cable is arranged inside the pipe in step b) by pushing the electrical cable by the cooling liquid, thereby filling the larger amount of the cooling liquid into the pipe.

9. The method according to claim 7, wherein the excess amount of the cooling liquid is drained from the pipe by a pump or by pressurized air.

10. The method according to claim 7, wherein the pipe is ventilated during the draining of the excess amount of the cooling liquid from the pipe.

11. The method according to claim 10, wherein the pipe is ventilated by a ventilation element arranged at a free end of the second portion of the pipe, the ventilation element including a floater.

12. The method according to claim 7, wherein the amount of the cooling liquid or the larger amount of the cooling liquid is filled into the pipe through an access port of the pipe.

13. The method according to claim 12, wherein the excess amount of the cooling liquid is drained from the pipe through the access port of the pipe.

14. The method according to claim 1, wherein one or both of the offshore installation and the other offshore installation is/are an energy generating installation, a wind turbine, a substation of a wind farm, a tidal power facility, an oil rig and/or a gas rig.

15. The method according to claim 1, wherein the cooling liquid is water, seawater, a brine solution and/or a glycol aqueous solution.

* * * * *